(12) United States Patent (10) Patent No.: US 9,457,366 B2
Landmer (45) Date of Patent: Oct. 4, 2016

(54) SPRAY LANCE ARRANGEMENT

(71) Applicant: ALSTOM Technology Ltd, Baden (CH)

(72) Inventor: Per Hakan Fredrik Landmer, Vaxjo (SE)

(73) Assignee: General Electric Technology GmbH, Baden (CH)

( * ) Notice: Subject to any disclaimer, the term of this patent is extended or adjusted under 35 U.S.C. 154(b) by 727 days.

(21) Appl. No.: 13/911,595

(22) Filed: Jun. 6, 2013

(65) Prior Publication Data

US 2014/0014139 A1    Jan. 16, 2014

Related U.S. Application Data

(60) Provisional application No. 61/671,266, filed on Jul. 13, 2012.

(51) Int. Cl.
| | | |
|---|---|---|
| *B01F 3/04* | (2006.01) | |
| *B05B 7/04* | (2006.01) | |
| *B01F 5/04* | (2006.01) | |
| *B01F 3/12* | (2006.01) | |
| *B01F 7/02* | (2006.01) | |
| *B05B 1/26* | (2006.01) | |
| *B05B 1/04* | (2006.01) | |

(52) U.S. Cl.
CPC .......... *B05B 7/0491* (2013.01); *B01F 3/04099* (2013.01); *B01F 3/1207* (2013.01); *B01F 3/1228* (2013.01); *B01F 5/0403* (2013.01); *B01F 5/0405* (2013.01); *B01F 5/0463* (2013.01); *B01F 7/022* (2013.01); *B05B 1/04* (2013.01); *B05B 1/267* (2013.01); *B05B 7/0416* (2013.01); *B05B 7/0433* (2013.01)

(58) Field of Classification Search
CPC .. B01F 3/04; B01F 3/04099; B01F 3/04241; B01F 5/00; B01F 2005/0002; B01F 5/04; B01F 5/0403; B01F 5/0405; B05B 7/04; B05B 7/0416; B05B 7/0441
USPC .......................... 261/78.2, 76, 77; 239/427.3
See application file for complete search history.

(56) References Cited

U.S. PATENT DOCUMENTS

| | | |
|---|---|---|
| 2,530,671 A | 11/1950 | Wahlin |
| 4,343,434 A | 8/1982 | Haruch |
| 4,591,099 A | 5/1986 | Emory et al. |
| 4,893,752 A * | 1/1990 | Spink ........................ B05B 7/08 239/427.3 |
| 2003/0146301 A1 | 8/2003 | Sun et al. |
| 2007/0068597 A1 | 3/2007 | Dorsch et al. |

FOREIGN PATENT DOCUMENTS

| | | |
|---|---|---|
| EP | 1 170 058 A2 | 1/2002 |
| WO | 96/16722 | 6/1996 |
| WO | 00/18514 A1 | 4/2000 |

\* cited by examiner

*Primary Examiner* — Robert A Hopkins
(74) *Attorney, Agent, or Firm* — Rita D. Vacca

(57) ABSTRACT

A two media spray lance and nozzle useful for moistening at least a portion of absorbent material present in a mixer. The nozzle includes a central body with a connecting portion for connecting the nozzle to the two media spray lance for a supply of liquid and gas thereto, and an atomizing portion. The atomizing portion delivers droplets of liquid to the absorbent material present in the mixer to obtain moistened absorbent material.

20 Claims, 7 Drawing Sheets

Figure 1:
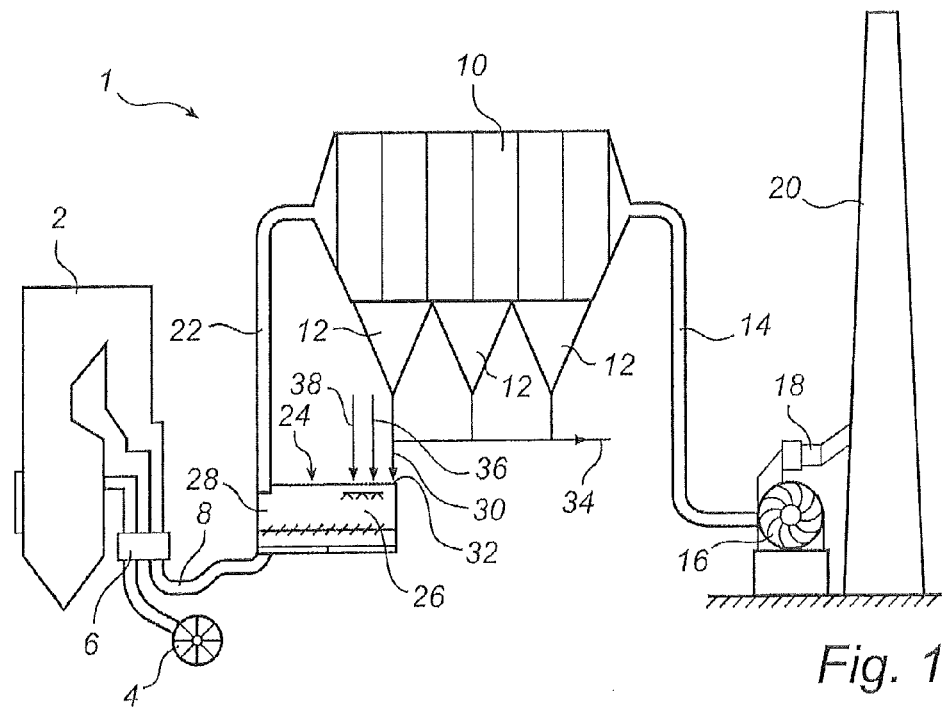

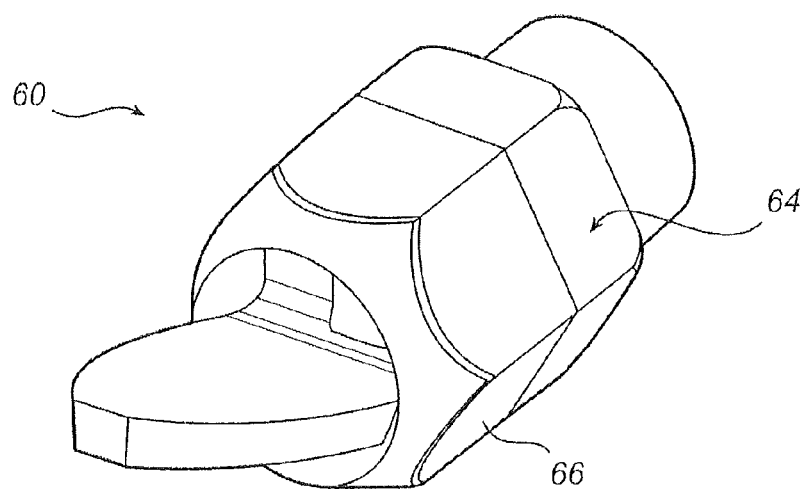
Fig. 3
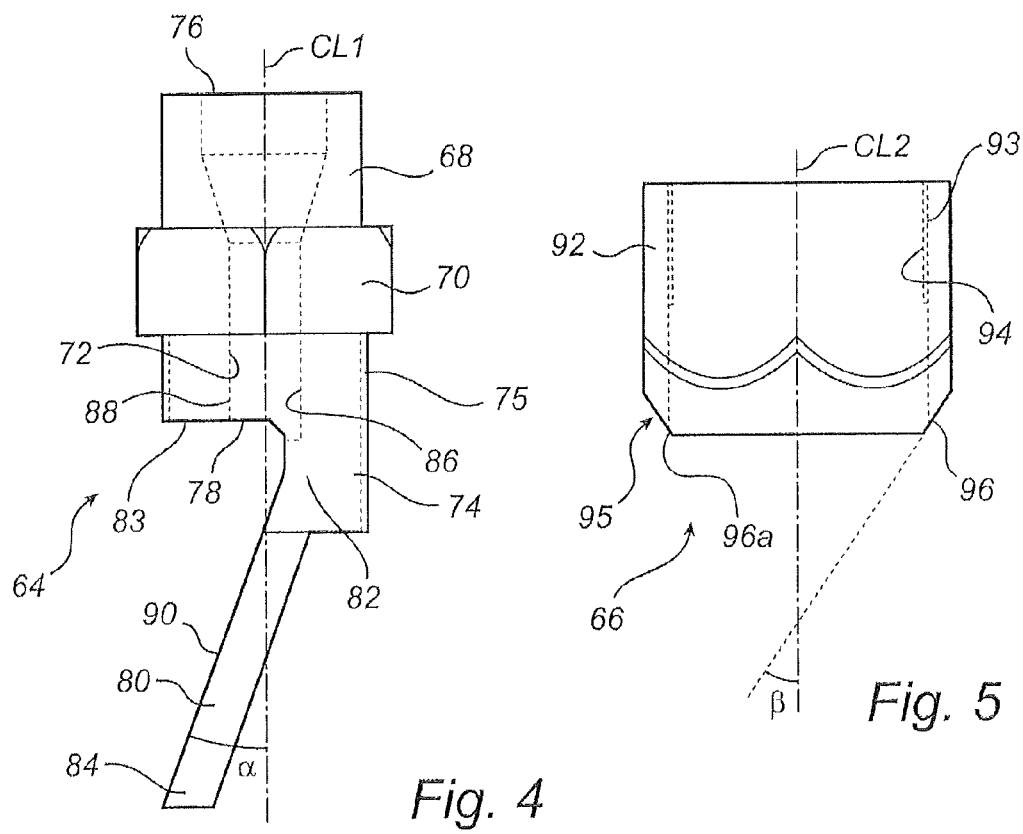
Fig. 4
Fig. 5

SPRAY LANCE ARRANGEMENT

CROSS-REFERENCE TO RELATED APPLICATION

This application claims the benefit of U.S. Provisional Patent Application Ser. No. 61/671,266; filed on Jul. 13, 2012, entitled "SPRAY LANCE ARRANGEMENT" which is incorporated herein by reference in its entirety.

FIELD OF THE INVENTION

The present disclosure relates to a two media spray lance and nozzle combination for spraying a liquid. Such a two media spray lance and nozzle combination may, for example, be arranged inside a mixer for moistening an absorbent material for removing gaseous pollutants from hot process gases.

BACKGROUND ART

When separating gaseous pollutants from process gases, such as flue gases from a coal-fired or oil-fired power plant, a method is frequently used in which a lime-containing absorbent material is introduced into the process gases to react with the gaseous pollutants so as to allow removal thereof. When the absorbent material reacts with the gaseous pollutants, the gaseous pollutants are converted chemically or physically into dust, which is then separated in a filter from the remaining gases. WO 96/16722 discloses a method, in which lime-containing dust is mixed with water in a mixer and then introduced into a contact reactor to react with gaseous pollutants in a flue gas flowing therethrough. The resultant dust including the chemically or physically converted gaseous pollutants is then separated in a filter, circulated to the mixer, and mixed again with water to be reintroduced into the contact reactor to repeat the process.

It has now been found that the mixing of water and dust in the mixer is sometimes less efficient, which results in less efficient removal of gaseous pollutants from the process gases.

SUMMARY OF THE INVENTION

The object of the present disclosure is therefore to provide a two media, i.e., liquid and gas, spray lance and nozzle combination, which nozzle supplies liquid in an efficient spray pattern in a mixer when a lower spray load is required within the mixer.

This object is achieved by a two media spray lance and nozzle for spraying a liquid in a mixer, that comprises a nozzle central body comprising a connecting portion with a first opening for fluidly connecting the nozzle to a two media spray lance for a liquid supply and an air supply to form an air dispersed liquid, and an atomizing portion with a second opening in fluid communication with the connecting portion for forming droplets of the air dispersed liquid flowing thereto from the connecting portion, wherein the two media spray lance comprises a liquid supply pipe for a flow of liquid from a liquid supply and an air supply pipe for a flow of air from an air supply, with the air supply pipe arranged with a first opening external to the liquid supply pipe and fluidly connected to the air supply, and a plurality of second openings arranged internal within the liquid supply pipe for air flow from the air supply pipe into the flow of liquid in the interior of the liquid supply pipe to disperse the liquid to form air dispersed liquid prior to flow of the air dispersed liquid into the nozzle.

An advantage of this two media spray lance and nozzle is that by adjusting the volume of air flow from the plurality of second openings into the liquid flow within the liquid supply pipe, the spraying characteristics of the nozzle, such as the spray angle, are very constant. Such is the case even when the pressure of the liquid supplied to the nozzle is varied for purposes of matching mixer moisture demands, particularly under conditions where liquid pressures measure 2 bar or less. This makes it possible to vary the amount of liquid that is atomized by the nozzle over an especially wide range, with relatively small variations in the spray characteristics of the nozzle.

According to a further aspect of the present disclosure, there is provided a mixer for moistening absorbent material for use in removing gaseous pollutants from hot process gases comprising at least one nozzle with a two media spray lance for spraying liquid onto absorbent material present inside of the mixer, the two media spray lance and nozzle comprising the nozzle with a central body comprising a connecting portion for connecting the nozzle to the two media spray lance, and an atomizing portion in fluid communication with the connecting portion for a flow of liquid and air thereto from the two media spray lance to form droplets of the liquid, and the two media spray lance comprising a liquid supply pipe fluidly connected to a liquid supply for a supply of liquid thereto, and an air supply pipe fluidly connected to an air supply for a supply of air thereto, wherein the air supply pipe extends through a portal in the liquid supply pipe with a first opening arranged external to the liquid supply pipe fluidly connected to the air supply, and a plurality of second openings arranged internal to the liquid supply pipe for a flow of air from the air supply pipe into the liquid supply pipe to disperse the liquid flowing therethrough to form air dispersed liquid therein, for flow of the air dispersed liquid into the connecting portion of the nozzle.

An advantage of the mixer being provided with such a two media spray lance and nozzle combination is that the moistening of the absorbent material will be efficient, with little or no water being unintentionally sprayed onto internal structures of the mixer which may lead to material clumping. Furthermore, changes in the amount of water required for moistening the dust can be handled by inversely varying the water pressures and air pressures supplied to the nozzle, so that variations in water pressures to match mixer liquid demands do not substantially influence the spray angle or the spray pattern of the nozzle. Hence, the two media spray lance allows for significantly greater water pressure variation without influencing the spray angle or spray pattern of the nozzle, by allowing for increased air pressures as water pressures are decreased.

According to a yet further aspect of the present disclosure, there is provided a method of atomizing a liquid, comprising supplying a liquid dispersed by air to a nozzle comprising a central body comprising a connecting portion for fluidly connecting the nozzle to a supply of liquid and a supply of air for dispersing the liquid to form air dispersed liquid prior to flow into the nozzle, and an atomizing portion for forming droplets of the air dispersed liquid flowing from the connecting portion to the atomizing portion of the nozzle; and atomizing the air dispersed liquid using the nozzle to form an essentially flat spray of liquid droplets from the nozzle.

Figure 2:
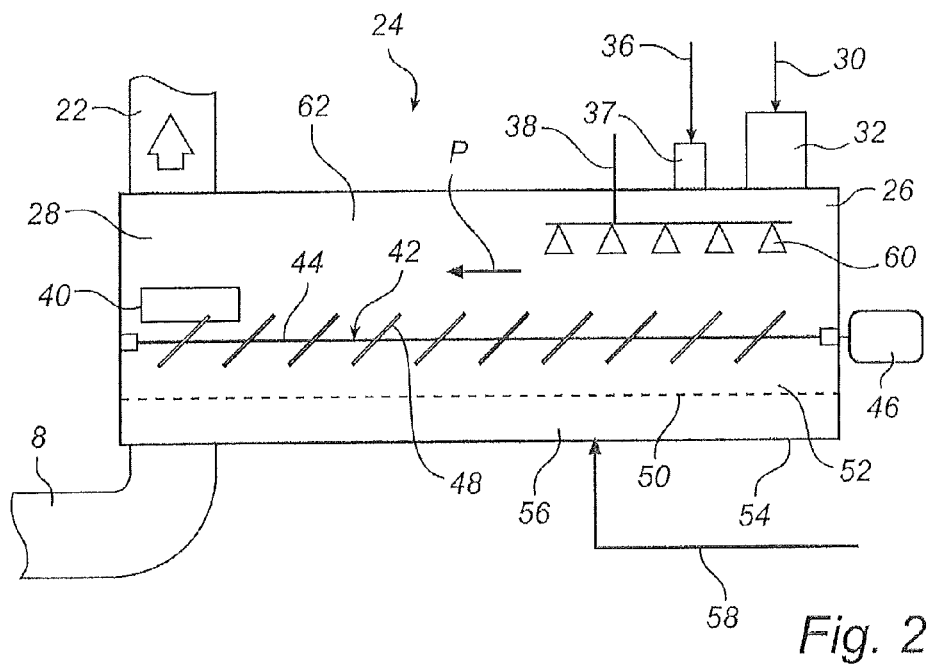

According to a still further aspect of the present disclosure, there is provided a method of moistening absorbent material for use in removing gaseous pollutants from a process gas, the method comprising using a mixer having at least one two media spray lance and nozzle combination for spraying liquid onto absorbent material present inside of the mixer, the two media spray lance and nozzle combination comprises a nozzle with a central body comprising a connecting portion for fluidly connecting the nozzle to a liquid supply pipe for a supply of liquid thereto from a liquid supply, with the liquid supply pipe comprising therein a portal with an air supply pipe arranged therethrough with a first opening arranged external to the liquid supply pipe and fluidly connected to a supply of air from an air supply, and a plurality of second openings arranged internal within the liquid supply pipe for air flow from the supply of air through the air supply pipe and into the flow of liquid to disperse the liquid to form air dispersed liquid prior to the air dispersed liquid entering the nozzle, an atomizing portion of the central body forming liquid droplets of the air dispersed liquid, and the nozzle atomizing the liquid droplets to moisten at least a portion of the absorbent material present inside the mixer.

Further advantages and features of the invention will be evident from the following description and the appended claims.

BRIEF DESCRIPTION OF THE DRAWINGS

The invention will now be described in more detail by way of exemplary embodiments and with reference to the accompanying drawings.

FIG. 1 is a schematic side view of a power plant which is provided with equipment for cleaning process gases.

FIG. 2 is a schematic cross-sectional view of a mixer according to FIG. 1 in detail.

FIG. 3 is three-dimensional view of a nozzle of the mixer of FIG. 2.

FIG. 4 is a side view of a central body of the nozzle of FIG. 3.

FIG. 5 is a side view of a sleeve of the nozzle of FIG. 3.

FIG. 6*a* is a side view of the complete nozzle.

FIG. 6*b* is a front view of the complete nozzle.

FIG. 7 is a bottom cross-sectional view of the nozzle taken along line VII-VII and viewed in the direction of the arrows of FIG. 6*a*.

FIG. 8 is a side view of a two media spray lance fluidly connected to the nozzle of FIG. 6*a*.

FIG. 9 is a view of FIG. 8 with a cut away of the two media spray lance water supply pipe to illustrate the air supply pipe arrangement therein.

DESCRIPTION OF PREFERRED EMBODIMENTS

FIG. 1 shows schematically a power plant 1. The power plant 1 has a coal-fired boiler 2 to which a gas containing oxygen is fed by means of a fan 4 to a fluidly connected preheater 6. Hot process gases, which may also be referred to as flue gases, containing dust, such as fly ash, and gaseous pollutants, such as sulfur dioxide, are produced in the boiler 2. The hot flue gases produced in boiler 2 are passed in a duct 8 through the preheater 6, where the flue gases exchange heat with the oxygen containing gas fed thereto by fan 4. From the preheater 6, flue gases then flow to a dust separator in the form of a fabric filter 10. Dust is separated from the flue gases in the fabric filter 10 and collected in three dust hoppers 12 of the fabric filter 10. The cleaned flue gas leaves the fabric filter 10 through a duct 14 and is fed by means of a fan 16 through a duct 18 to a stack 20 to be emitted into the atmosphere.

The duct 8 has a vertical duct portion which constitutes a contact reactor 22. A mixer 24 communicates with the contact reactor 22 in the lower part thereof. The mixer 24 has a first end 26 and a second end 28. A circulating part of the dust collected in the dust hoppers 12 is fed through a chute 30 to an inlet 32 located at the first end 26 of the mixer 24. A small amount of the dust collected in the dust hoppers 12 is fed through a duct 34 for processing or land filling. Fresh absorbent material in the form of, for example, burnt lime, CaO, is fed through a chute 36, and a liquid, which may typically be process water, is supplied via a water supply pipe 38.

FIG. 2 illustrates the mixer 24 in more detail. The circulating part of the dust collected in the dust hoppers 12 is fed through the chute 30 to the inlet 32 located at the first end 26 of the mixer 24. The fresh absorbent material is fed through the chute 36 into the mixer 24 through an absorbent inlet 37 located at the first end 26 of the mixer. At the second end 28, the mixer 24 has an outlet 40 formed as an overflow intended for moistened absorbent material. Hence, the dust will be forwarded, in a direction indicated by arrow P, from the first end 26 to the second end 28 of the mixer 24 while being moistened. Part of the second end 28 of the mixer 24 is placed inside the contact reactor 22 in such a manner that moistened absorbent material leaving the mixer 24 through the outlet 40 will be entrained by the flue gas flowing upwards in the contact reactor 22.

The mixer 24 has a mechanical stirrer 42 which has a shaft 44 extending from the first end 26 to the second end 28 and journalled in bearings in the respective ends 26, 28. A motor 46 is arranged to rotate the shaft 44 and agitating devices, such as inclined, elliptic discs or paddles 48 that are fixedly connected to the shaft 44.

A gas-permeable cloth 50 is fixed in the lower portion 52 of the mixer 24. The space between the cloth 50 and a bottom 54 of the mixer 24 forms a chamber 56. An air pipe 58 is arranged to supply compressed air to the chamber 56. Since the cloth 50 is permeable to gas, the compressed air supplied through the fluidly connected pipe 58 will fluidize the supplied dust above the chamber 56 during the moistening and mixing thereof.

A number of nozzles 60 are arranged in interior 62 of the mixer 24 above the chamber 56. The two media spray lance 38 is arranged to supply air dispersed water to the nozzles 60. The nozzles 60 atomize the air dispersed water supplied thereto and forwards the water to the dust fluidized in the mixer 24 to cause a moistening of the dust prior to forwarding the dust to the contact reactor 22 in which the moistened dust will be mixed with the flue gases and react with gaseous pollutants contained in the flue gases.

FIG. 3 illustrates the nozzle 60 in a three-dimensional view. The environment in interior 62 of the mixer 24 illustrated in FIG. 2 is filled with dust and moisture, which would potentially cause clogging of the nozzle 60. The nozzle 60 is provided with several features, as will be described in more detail hereinafter, that reduces the risk of aggregates of moistened dust being formed on the nozzle 60 during operation of the mixer 24.

The nozzle 60 comprises a central body 64, which will be described in more detail hereinafter with reference to FIG. 4, and a sleeve 66, which will be described in more detail hereinafter with reference to FIG. 5.

FIG. 4 illustrates the central body 64 as seen in a side view. The central body 64 comprises a connecting portion 68, which may, for example, be threaded, for fluid connection to the water supply pipe 38a of the two media spray lance 38 of FIGS. 1 and 2. The central body 64 further comprises a hexagonal mounting portion 70 adapted for cooperation with a wrench used for turning the central body 64 when mounting the same to the water supply pipe 38a. A cylindrical liquid supply pipe 72 extends through the central body 64, from the connecting portion 68, at which the liquid supply pipe 72 is adapted to be fluidly connected to the water supply pipe 38a, via the mounting portion 70, and further to an atomizing portion 74 of the central body 64. The water would typically be supplied to the liquid supply pipe 72 at a pressure of 0.7 to 10 bar above atmospheric pressure, and at a water temperature of typically 0 to 70° C. The atomizing portion 74 may be provided with a thread 75.

The liquid supply pipe 72 has a first opening 76 arranged at the connecting portion 68, and a second opening 78 arranged at the atomizing portion 74. The atomizing portion 74 comprises a deflecting plate 80. The deflecting plate 80 has a starting portion 82 and an end portion 84. The starting portion 82, at which the deflecting plate 80 is mounted to the atomizing portion 74, is arranged at a first side 86 of the liquid supply pipe 72. The deflecting plate 80 extends from the starting portion 82 and away from the second opening 78. The deflecting plate 80 points downwards, in the illustration of FIG. 4, and towards a second side 88 of the liquid supply pipe 72, to, hence, have the end portion 84 "cover" the second opening 78, when seen from below, in the perspective of FIG. 4.

The deflecting plate 80 has a deflection surface 90 which is sloped over the second opening 78. The deflection surface 90 of this embodiment is a plane surface. An angle α between the deflection surface 90 and a centre line CL1 of the liquid supply pipe 72 may typically be in the range of 15-25°. The angle α may for example be about 19°. The deflection surface 90 preferably has a surface roughness, $R_a$, of 0.01 to 2.0 micrometer, more preferably 0.05 to 1.2 micrometer.

FIG. 5 illustrates the sleeve 66 as seen in a side view. The sleeve 66 comprises a hexagonal mounting portion 92 and a central aperture 94 adapted for co-operation with the atomizing portion 74 of the central body 64 illustrated in FIG. 4. The central aperture 94 may optionally be provided with a thread 93 formed in its central aperture 94 for co-operation with the thread 75 of the atomizing portion 74 of the central body 64. Preferably, the optional thread 93 would only be arranged in the upper portion of the sleeve 92, as illustrated in FIG. 5.

The sleeve 66 is provided with a sharp edged spray angle controlling rim 95. An edge 96 of the rim 95 is inclined inwardly towards a centre line CL2 of the sleeve 66. An angle β between the edge 96 of the rim 95 and the centre line CL2 of the sleeve 66 may typically be in the range of 20-60°. The angle β may for example be about 30°. The edge 96 of the rim 95 ends in a circumferential end point 96a, which controls the spray angle of the nozzle 60.

Figure 6A:
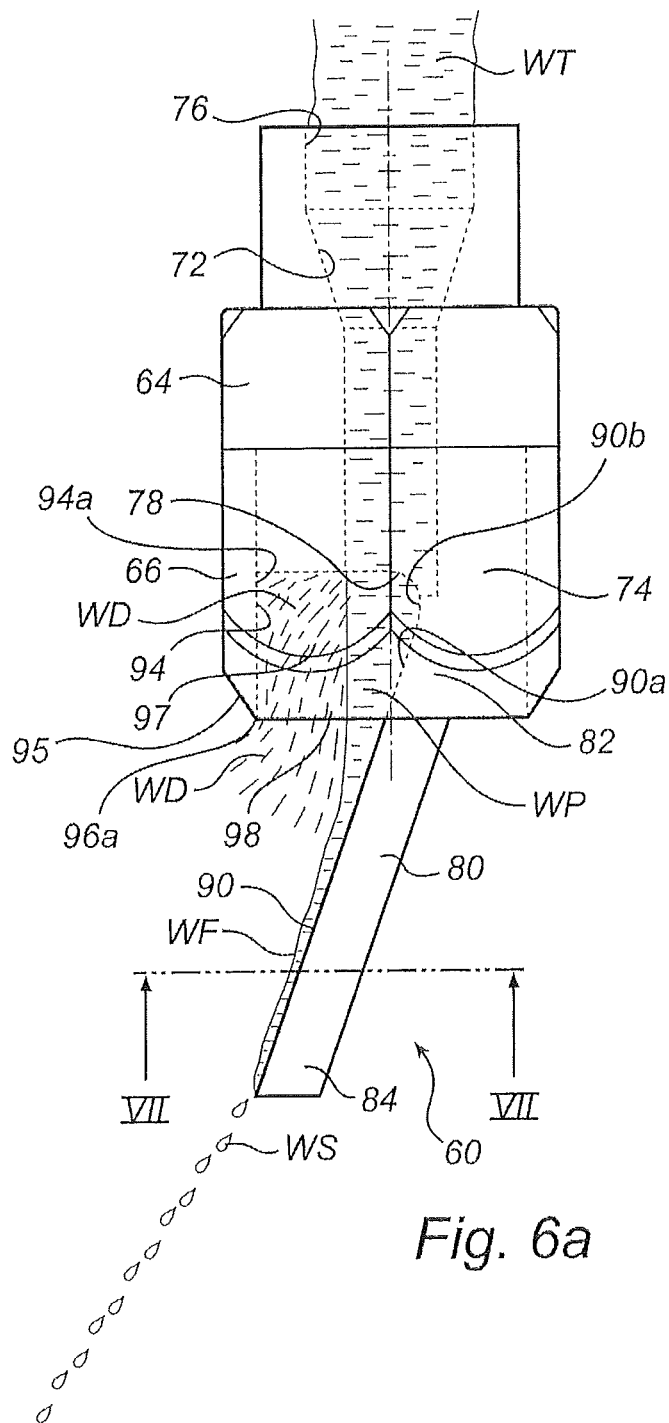
Figure 6B:
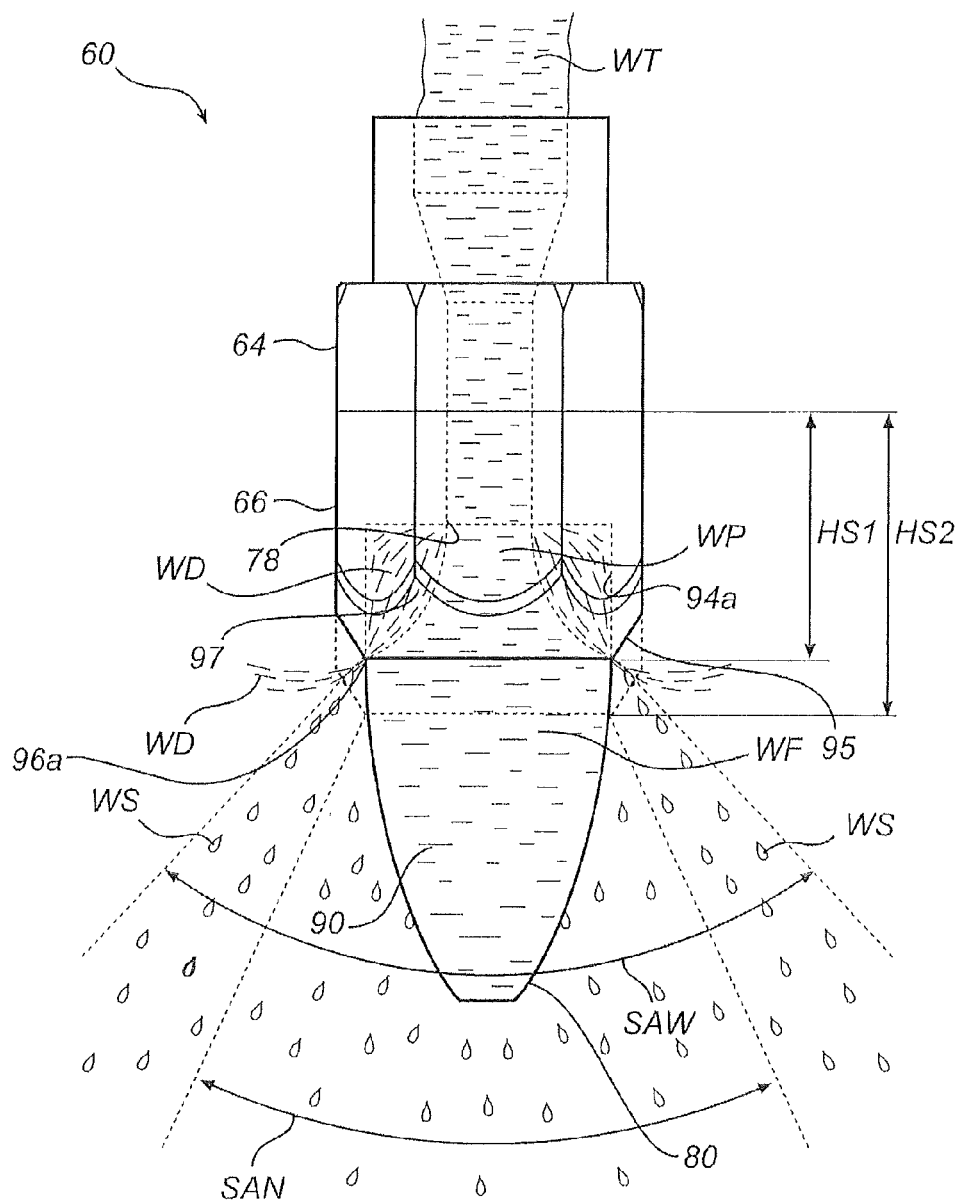

FIG. 6a illustrates the nozzle 60 in a side view, and FIG. 6b illustrates the nozzle 60 in a front view, with the sleeve 66 mounted on the central body 64. The sleeve 66 at least partly encloses the atomizing portion 74 of the central body 64. The nozzle 60 has a cleaning chamber 97. The cleaning chamber 97 is defined by the atomizing portion 74 with the starting portion 82 forming one side wall and a roof 83, illustrated in FIG. 4, of the cleaning chamber 97, and with the aperture 94 of the sleeve 66 forming the other side wall 94a of the cleaning chamber 97. A portion 90a of the deflection surface 90 of the deflecting plate 80 forms a portion of a side wall 90b of the cleaning chamber 97. The cleaning chamber 97 has an opening 98, directed downwards in the perspective illustrated in FIG. 6a.

As illustrated in FIGS. 6a and 6b the spray angle controlling rim 95 of the sleeve 66 encircles the atomizing portion 74 in a position which is located between the second opening 78 and the end portion 84 of the deflecting plate 80.

In operation water, WT, enters the liquid supply pipe 72 via the first opening 76 and flows toward the second opening 78. At the second opening 78 water "pillar" WP is formed and flows toward the deflection surface 90 of the deflecting plate 80. Upon impingement with the deflection surface 90 the water pillar WP is transformed into a water film WF, having the shape of a flat liquid film, which flows downward, as illustrated in FIGS. 6a and 6b, and toward the sides of the deflection surface 90.

Typically, the impingement of the water pillar WP with the deflection surface 90 would occur at least partly at that portion 90a of the deflection surface 90 located inside of the cleaning chamber 97. Hence, deflection of the water pillar WP will start already inside the cleaning chamber 97, and inside the central aperture 94 of the sleeve 66. The edge 96a of the rim 95 will determine the angle of water film WF generated by the impingement of the water pillar WP against the deflection surface 90, and will, as described hereinafter, determine the spray angle of the nozzle 60. As the water film WF leaves the deflection surface 90 water droplets WS are formed as the water film WF breaks up, such water droplets WS moistening the dust present in the mixer 24 illustrated in FIG. 2. Hence, in a method of atomizing a liquid, the liquid is supplied to the nozzle 60 and is atomized by the nozzle 60 to form an essentially flat spray of liquid droplets, as illustrated in FIGS. 6a and 6b. Furthermore, in a method of moistening an absorbent material present inside of the mixer 24, illustrated in FIG. 2, for preparing the absorbent material for removal of gaseous pollutants of a flue gas, liquid, typically water, is supplied to one or more nozzles 60 arranged inside of the mixer 24, wherein the liquid supplied to the nozzle/nozzles 60 is atomized by the nozzle/nozzles 60 to moisten at least a portion of the absorbent material present inside the mixer 24.

A minor portion of the water WT may, upon being ejected via the second opening 78 of the liquid supply pipe 72, be deflected from the water pillar WP. A minor portion of the water film WF may also or alternatively be deflected upon interacting with the rim 95. Such deflected water portion/portions, WD, will cause a flushing of the interior of the cleaning chamber 97 and will prevent the build-up of any deposits in the area of the second opening 78. Typically the deflected water portion WD will amount to less than 3%, and typically 0.001 to 1%, of the total amount of water WT entering the nozzle 60 via the first opening 76. After such flushing inside of the cleaning chamber 97 the deflected water portion WD will leave the cleaning chamber 97 via the opening 98.

The vertical position, illustrated in FIGS. 6a and 6b, at which the spray angle controlling rim 95 of the sleeve 66 encircles the atomizing portion 74 will influence the spray angle. Thus, the vertical position of the rim 95 between the second opening 78 and the end portion 84 of the deflecting plate 80 determines the spray angle of the nozzle 60. The position of the rim 95 is determined by the height of the sleeve 66. A low height HS1 of the sleeve 66 results in a relatively wide spray angle SAW, and a high height HS2 of the sleeve 66 results in a relatively narrow spray angle SAN, as best illustrated in FIG. 6b.

Figure 7:
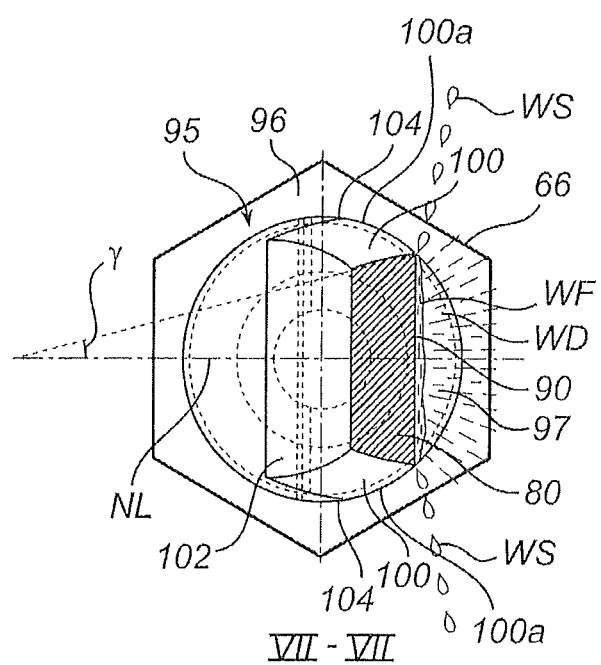

FIG. 7 illustrates the nozzle 60 in a bottom cross-sectional view taken along line VII-VII and viewed in the direction of the arrows of FIG. 6a. The deflecting plate 80 has sharp lateral edges 100 extending backward and toward each other from the deflection surface 90. The lateral edges 100 converge with the deflection surface 90 at respective point edges 100a. An angle γ between the respective lateral edge 100 of the deflecting plate 80 and a normal line NL, which is normal, i.e. at right angles, to the deflection surface 90, may typically be in the range of 10-40°, more typically in the range of 15-25°. The angle γ may for example be about 20°. Typically, the lateral edges 100 have a surface roughness, $R_a$, of 0.2 to 3 micrometer.

The water film WF flowing toward the sides of the deflection surface 90 will leave the deflection surface 90 at the transition from the deflection surface 90 to the respective lateral edges 100 and form water droplets WS. Thanks to the angle γ and the point edges 100a of the lateral edges 100, the water film WF will release very efficiently from the deflecting plate and only a relatively small portion, if any, of the water film WF will tend to "turn around the corner" and wet the backside 102 of the deflecting plate 80. If the backside 102 gets wet, dust, for example dust from a material treated in the mixer 24 of FIG. 2, may form aggregates on the backside 102. Eventually such dust aggregates may grow to the deflection surface 90 and deteriorate its function.

Points of transition 104 between the deflection surface 90 on the one hand and the edge 96 of the rim 95 on the other hand involves a tight-fitted transition between the sharp edged rim 95 and the sharp lateral edges 100. By "tight-fitted transition" is meant that a shortest distance between lateral edge 100 and the rim 95 is 0 to 0.5 mm, preferably 0 to 0.25 mm. For example, the end point 96a of the edge 96 of the rim 95 may be in direct contact with the point edges 100a of the lateral edges 100, such direct contact resulting in tight-fitted points of transitions 104 with a shortest distance between lateral edge 100 and the rim 95 of 0 mm. Such transitions 104, between sharp edges and with a tight fit, further reduces the amount of the water film WF, if any, that "turns around the corner" wetting the backside 102 of the deflecting plate 80. Furthermore, the tight fit keeps the deflected water portion, WD, confined in the cleaning chamber 97, such that the deflected water portion WD will not wet the backside 102.

Example

A test was performed to evaluate the influence of the water pressure on the spray angle. In particular when spraying in confined areas, such as in the mixer 24 illustrated in FIG. 2, it is important that the spray angle does not change significantly when varying the amount of water sprayed per unit of time. Varying the amount of water sprayed per unit of time is made by varying the water pressure. In the example, the nozzle 60 described hereinabove with reference to FIGS. 3-7 was compared to a nozzle of the type Spraying Systems Flatjet 5040 which is available from Spraying Systems Co. Wheaton, Ill., USA. Different water pressures (in bar overpressure, i.e. pressure above atmospheric), were supplied to the nozzles, and the spray angles, similar to angle SAW illustrated in FIG. 6b, were measured. The results are presented in Table 1, below.

TABLE 1

Spray angles of nozzles at various pressures.

| Water pressure [bar overpressure] | Spraying Systems Flatjet 5040 [spray angle in °] | Nozzle (60) of present disclosure [spray angle in °] |
|---|---|---|
| 0.7 | 38 | 44 |
| 1.5 | 45 | 52 |
| 2.0 | 47 | 56 |
| 3.0 | 50 | 56 |
| 4.0 | 52 | 56 |
| 6.0 | 53 | 56 |
| 7.0 | 55 | 56 |
| 8.0 | 57 | 56 |
| 9.0 | 58 | 56 |
| 10.0 | 58 | 56 |

From Table 1 it can be understood that increasing the pressure from 0.7 bar(o) to 10 bar(o) results in the spray angle increasing by 58−38=20° for the nozzle Spraying Systems Flatjet 5040, while the same increase in pressure for the nozzle 60 of the present disclosure only increases the spray angle by 56−44=12°.

Furthermore, the spray angle of the nozzle 60 of the present disclosure is completely constant at 56° within a water pressure range of 2 bar (o) and up to 10 bar (o). For the nozzle Spraying Systems Flatjet 5040 the spray angle increases from 47 to 58°, i.e. an increase by 11°, when increasing the water pressure from 2 bar(o) and up to 10 bar(o). Hence, with the nozzle 60 of the present disclosure, the spray angle is almost constant over a very broad water pressure range. This makes it relatively easy to predict which area within, for example, the mixer 24 that will be subjected to water spray from nozzle 60, regardless of the actual, and possibly varying, water pressure. Thereby, inadvertently spraying water at structures within interior 62 of mixer 24 that should not be wetted can be avoided when using the nozzle 60.

Figure 8:
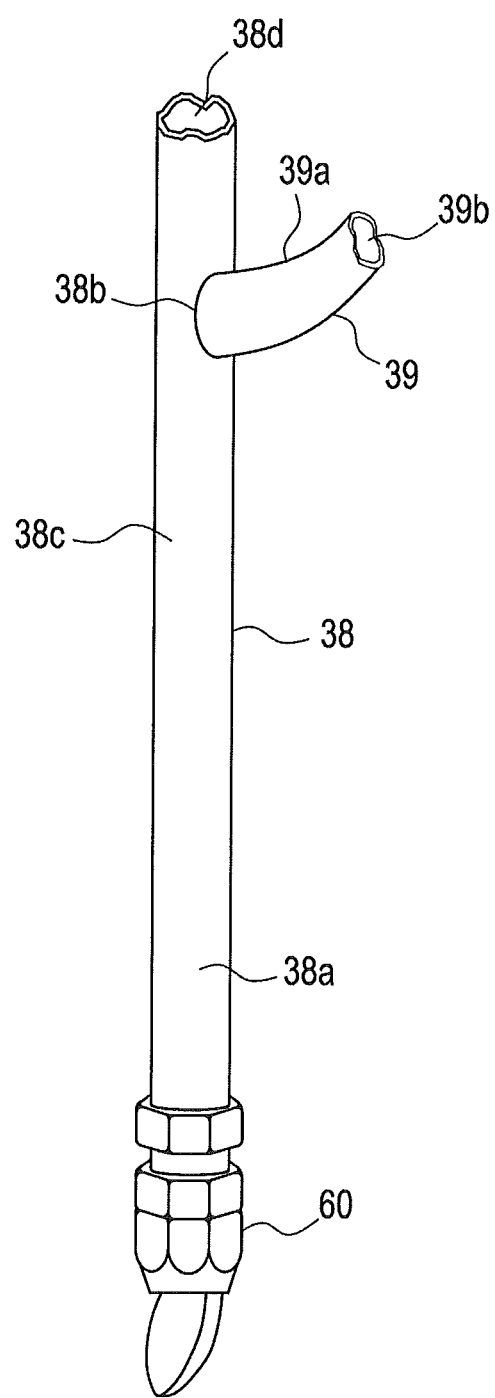
Figure 9:
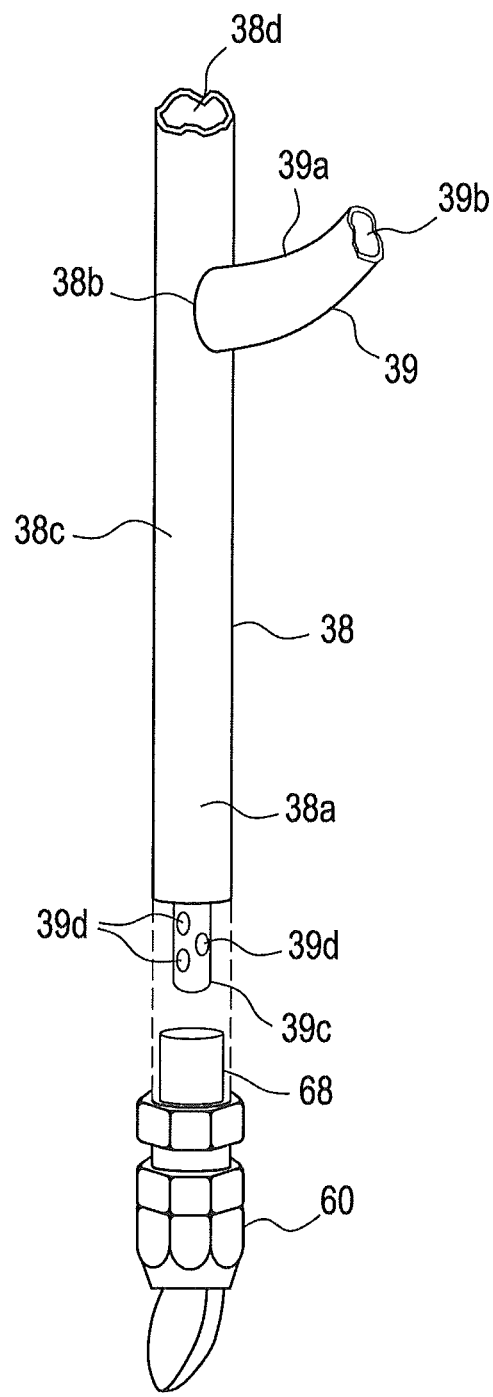

Illustrated in FIG. 8, is the two media spray lance 38 particularly useful with nozzle 60 to allow for a constant spray angle from nozzle 60 regardless of water pressure variations, particularly for water pressures of approximately 2 bar(o) to 0.3 bar. The subject two media spray lance 38 comprises a water supply pipe 38a fluidly connected to nozzle 60 by removable attachment to connecting portion 68. Though water supply pipe 38a is a portal 38b through which an air supply pipe 39 extends from water supply pipe exterior 38c to water supply pipe interior 38d. A first end 39a of air supply pipe 39 is fluidly connected at a first opening 39b to an air supply (not shown) beyond water supply pipe exterior 38c. Opposite first end 39a is second end 39c of air supply pipe 39. Second end of 39c is arranged within water supply pipe interior 38d at but not within connecting portion 68 of nozzle 60. Second end 39c comprises a plurality of second openings 39d through which air flows from the air supply to the water supply pipe interior 38d to disperse the water flowing therethrough to form air dispersed water, as best illustrated in FIG. 9. The air supply provides a supply of air or other suitable gas to the air supply pipe 39 and hence water supply pipe interior 38d. As water pressure within water supply pipe 38 varies according to moisture needs within the mixer 24, air is supplied to the water supply pipe interior 38d to disperse the water flowing therethrough and maintain a consistent pressure within the water supply pipe 38. As such, a constant spray angle is achieved from nozzle 60 regardless of water pressure variations, particularly for a range of water pressures of approximately 2 bar(o) to 0.3 bar.

It will be appreciated that many modifications of the embodiments described above are conceivable within the scope of the invention as defined by the appended claims.

Hereinabove, it has been described that the two media spray lance 38 and nozzle 60 is arranged in a mixer 24 in which fluidized dust is moistened before being mixed with a flue gas in a contact reactor 22. It will be appreciated that the two media spray lance 38 and nozzle 60 could also be utilized in other environments. The two media spray lance 38 and nozzle 60 is particularly useful where there is dust present, and where there is a risk of moistened dust forming aggregates on the nozzle 60. One such embodiment is moistening of boiler ash, i.e., the spraying of water on boiler ash. Furthermore, the two media spray lance 38 and nozzle 60 may also be useful in other environments involving spraying liquid in confined spaces, where it is important that the spray of liquid is directed in a specific direction, to avoid spraying, inadvertently, on walls, roof, etc of the confined space.

To summarize, a nozzle for spraying a liquid comprises a central body comprising a connecting portion for connecting the nozzle to a two media spray lance for a supply of two media, i.e., liquid and air, thereto, and an atomizing portion for forming droplets of the supplied liquid. The two media spray lance comprises a liquid supply pipe and an air supply pipe arranged therein for air dispersal of the liquid flowing through the liquid supply pipe to form air dispersed liquid for flow into the nozzle for atomization of the liquid. The nozzle further comprises a sleeve mounted on the central body, the sleeve comprising a central aperture, which at least partly encloses the atomizing portion of the central body, and a spray angle controlling rim which at least partly encircles the atomizing portion.

While the invention has been described with reference to a number of preferred embodiments, it will be understood by those skilled in the art that various changes may be made and equivalents may be substituted for elements thereof without departing from the scope of the present invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A two media spray lance and nozzle for spraying a liquid in a mixer comprising:
a nozzle central body comprising a connecting portion with a first opening for fluidly connecting the nozzle to a two media spray lance for a liquid supply and an air supply to form an air dispersed liquid, and an atomizing portion with a second opening in fluid communication with the connecting portion for forming droplets of the air dispersed liquid flowing thereto from the connecting portion, and
a two media spray lance connected to the nozzle comprising a liquid supply pipe for a flow of liquid from a liquid supply and an air supply pipe for a flow of air from an air supply, with the air supply pipe arranged with a first opening external to the liquid supply pipe and fluidly connected to the air supply, and a plurality of second openings arranged internal within the liquid supply pipe for air flow from the air supply pipe into the flow of liquid in the interior of the liquid supply pipe to disperse the liquid to form air dispersed liquid prior to flow of the air dispersed liquid into the nozzle.

2. A two media spray lance and nozzle according to claim 1, wherein the nozzle further comprises a cleaning chamber defined by the atomizing portion.

3. A two media spray lance and nozzle according to claim 1, wherein the nozzle further comprises a deflecting plate with a deflection surface having a surface roughness, $R_a$, of 0.01 to 2.0 micrometer.

4. A two media spray lance and nozzle according to claim 3, wherein an angle α between the deflection surface and a center line of the liquid supply pipe is in the range of 15-25°.

5. A two media spray lance and nozzle according to claim 3, wherein the deflecting plate has lateral edges extending from the deflection surface at an angle γ of 10-40° to a normal line of the deflection surface.

6. A mixer for moistening absorbent material for use in removing gaseous pollutants from hot process gases comprising:
at least one nozzle with a two media spray lance for spraying liquid onto absorbent material present inside of the mixer, the two media spray lance and nozzle comprising the nozzle with a central body comprising a connecting portion for connecting the nozzle to the two media spray lance, and an atomizing portion in fluid communication with the connecting portion for a flow of liquid and air thereto from the two media spray lance to form droplets of the liquid, and the two media spray lance comprising a liquid supply pipe fluidly connected to a liquid supply for a supply of liquid thereto, and an air supply pipe fluidly connected to an air supply for a supply of air thereto, wherein the air supply pipe extends through a portal in the liquid supply pipe with a first opening arranged external to the liquid supply pipe fluidly connected to the air supply, and a plurality of second openings arranged internal to the liquid supply pipe for a flow of air from the air supply pipe into the liquid supply pipe to disperse the liquid flowing there through to form air dispersed liquid therein, for flow of the air dispersed liquid into the connecting portion of the nozzle.

7. A mixer according to claim 6, wherein the nozzle further comprises a cleaning chamber defined by the atomizing portion.

8. A mixer according to claim 6, wherein the nozzle further comprises a deflecting plate with a deflection surface having a surface roughness, $R_a$, of 0.01 to 2.0 micrometer.

9. A mixer according to claim 8, wherein an angle α between the deflection surface and a center line of the liquid supply pipe is in the range of 15-25°.

10. A mixer according to claim 8, wherein the deflecting plate has lateral edges extending from the deflection surface at an angle γ of 10-40° to a normal line of the deflection surface.

11. A method of atomizing a liquid comprising:
supplying a liquid dispersed by air to a nozzle comprising a central body comprising a connecting portion for fluidly connecting the nozzle to a supply of liquid and a supply of air for dispersing the liquid to form air dispersed liquid prior to flow into the nozzle, and an atomizing portion for forming droplets of the air dispersed liquid flowing from the connecting portion to the atomizing portion of the nozzle; and atomizing the air dispersed liquid using the nozzle to form an essentially flat spray of liquid droplets from the nozzle.

12. A method according to claim 11, wherein the nozzle further comprises a cleaning chamber defined by the atomizing portion.

13. A method according to claim 11, wherein the nozzle further comprises a deflecting plate with a deflection surface having a surface roughness, $R_a$, of 0.01 to 2.0 micrometer.

14. A method according to claim 13, wherein an angle α between the deflection surface and a center line of the liquid supply pipe is in the range of 15-25°.

15. A method according to claim 13, wherein the deflecting plate has lateral edges extending from the deflection surface at an angle γ of 10-40° to a normal line of the deflection surface.

16. A method of moistening absorbent material for use in removing gaseous pollutants from a process gas, the method comprising:

using a mixer having at least one two media spray lance and nozzle combination for spraying liquid onto absorbent material present inside of the mixer, with the two media spray lance and nozzle combination comprising a nozzle with a central body comprising a connecting portion for fluidly connecting the nozzle to a liquid supply pipe for a supply of liquid thereto from a liquid supply, with the liquid supply pipe comprising a portal with an air supply pipe arranged therethrough with a first opening arranged external to the liquid supply pipe and fluidly connected to a supply of air from an air supply, and a plurality of second openings arranged internal within the liquid supply pipe for air flow from the supply of air through the air supply pipe and into the flow of liquid to disperse the liquid and form air dispersed liquid prior to the air dispersed liquid entering the nozzle, and atomizing the liquid droplets with the nozzle to moisten at least a portion of the absorbent material present inside the mixer.

17. A method according to claim 16, wherein the nozzle further comprises a cleaning chamber defined by the atomizing portion.

18. A method according to claim 16, wherein the nozzle further comprises a deflecting plate with a deflection surface having a surface roughness, $R_a$, of 0.01 to 2.0 micrometer.

19. A method according to claim 18, wherein an angle α between the deflection surface and a center line of the liquid supply pipe is in the range of 15-25°.

20. A method according to claim 18, wherein the deflecting plate has lateral edges extending from the deflection surface at an angle γ of 10-40° to a normal line of the deflection surface.

* * * * *

UNITED STATES PATENT AND TRADEMARK OFFICE
CERTIFICATE OF CORRECTION

| | | |
|---|---|---|
| PATENT NO. | : 9,457,366 B2 | Page 1 of 1 |
| APPLICATION NO. | : 13/911595 | |
| DATED | : October 4, 2016 | |
| INVENTOR(S) | : Landmer | |

It is certified that error appears in the above-identified patent and that said Letters Patent is hereby corrected as shown below:

In the Specification

In Column 1, Line 7, delete "61/671,266; filed" and insert -- 61/671,266, filed --, therefor.

In Column 3, Line 52, delete "DESCRIPTION" and insert -- DETAILED DESCRIPTION --, therefor.

In Column 4, Lines 14-15, delete "water supply pipe 38." and insert -- water supply pipe 38a. --, therefor.

In Column 5, Line 40, delete "hexagonal mounting portion 92" and insert -- hexagonal mounting portion 70 --, therefor.

In Column 5, Line 47, delete "sleeve 92," and insert -- sleeve 66, --, therefor.

In Column 6, Line 23, delete "edge 96a" and insert -- edge 96 --, therefor.

Signed and Sealed this
Third Day of January, 2017

Michelle K. Lee
*Director of the United States Patent and Trademark Office*